(12) United States Patent
Kim et al.

(10) Patent No.: US 8,445,143 B2
(45) Date of Patent: May 21, 2013

(54) ELECTRODE FOR LITHIUM SECONDARY BATTERY

(75) Inventors: Young Soo Kim, Daejeon (KR); Soon Ho Ahn, Daejeon (KR)

(73) Assignee: LG Chem, Ltd., Seoul (KR)

( * ) Notice: Subject to any disclaimer, the term of this patent is extended or adjusted under 35 U.S.C. 154(b) by 964 days.

(21) Appl. No.: 11/056,290

(22) Filed: Feb. 11, 2005

(65) Prior Publication Data

US 2005/0238957 A1     Oct. 27, 2005

(30) Foreign Application Priority Data

Feb. 16, 2004    (KR) ...................... 10-2004-00100700

(51) Int. Cl.
     *H01M 6/16*      (2006.01)

(52) U.S. Cl.
     USPC ............................ 429/339; 429/188; 429/324

(58) Field of Classification Search
     None
     See application file for complete search history.

(56) References Cited

U.S. PATENT DOCUMENTS

| | | | |
|---|---|---|---|
| 4,544,615 A | 10/1985 | Shishikura et al. | 429/194 |
| 5,326,658 A | 7/1994 | Takahashi et al. | 429/194 |
| 5,496,656 A | 3/1996 | Inamasu et al. | |
| 5,693,433 A | 12/1997 | Zhukovskiy et al. | 429/192 |
| 5,750,282 A * | 5/1998 | Chi et al. | 429/49 |
| 6,306,546 B1 | 10/2001 | LaFleur et al. | |
| 6,535,373 B1 | 3/2003 | Smith et al. | |
| 6,656,633 B2 | 12/2003 | Yamakawa et al. | |
| 7,700,226 B2 | 4/2010 | Yong et al. | |
| 7,871,721 B2 | 1/2011 | Kim et al. | |
| 7,883,794 B2 | 2/2011 | Kim et al. | |
| 2002/0009649 A1 | 1/2002 | Sato et al. | |
| 2004/0013946 A1* | 1/2004 | Abe et al. | 429/326 |
| 2004/0076887 A1 | 4/2004 | Panitz et al. | |

FOREIGN PATENT DOCUMENTS

| | | |
|---|---|---|
| EP | 0 694 935 A1 | 1/1996 |
| JP | 60003862 A | 1/1985 |
| JP | 62-082648 | 4/1987 |
| JP | 7-176322 A | 7/1995 |
| JP | 11-506867 A | 6/1999 |
| JP | 2000-260428 | 9/2000 |
| JP | 2002-237304 | 8/2002 |

(Continued)

OTHER PUBLICATIONS

International Search Report for Application No. PCT/KR2005/000434; Date of Mailing: May 24, 2005.

(Continued)

*Primary Examiner* — Cynthia Walls
(74) *Attorney, Agent, or Firm* — Birch, Stewart, Kolasch & Birch, LLP

(57) ABSTRACT

Disclosed is an electrode comprising an aliphatic nitrile compound, wherein the aliphatic nitrile compound is coated on a surface of the electrode or is incorporated into the electrode active materials. A lithium secondary battery having the electrode is also disclosed. The lithium secondary battery has excellent safety so as to prevent ignition and explosion generated when the internal temperature of the battery is increased due to the heat emission caused by the reaction of an electrolyte with a cathode and the structural collapse of a cathode occurring upon overcharge. Additionally, it is also possible to prevent ignition and explosion when the battery is exposed to high temperature due to an increase in temperature resulting from heating or local short circuit caused by physical impacts. Further, it is possible to solve the problems of an increase in viscosity and degradation in battery performance at a low temperature occurring when an aliphatic nitrile compound is used as an additive for electrolyte.

21 Claims, 8 Drawing Sheets

FOREIGN PATENT DOCUMENTS

| | | |
|---|---|---|
| JP | 2002237331 | 8/2002 |
| JP | 2002-302649 A | 10/2002 |
| JP | 2004-179146 A | 6/2004 |
| KR | 20000002115 A | 1/2000 |
| KR | 20050089246 A | 9/2005 |
| RU | 2143768 | 12/1999 |
| SU | 1006543 A1 | 4/1981 |
| TW | 301069 A4 | 3/1997 |
| TW | 521450 A4 | 2/2003 |
| WO | 9735332 A1 | 9/1997 |
| WO | 2005069423 A1 | 7/2005 |

OTHER PUBLICATIONS

European Search Report; Application No. EP 05726460.8 (EP regional application of PCT/KR2005000434) dated Nov. 2, 2009.

International Search Report; International Application No. PCT/KR2006/000344; International filing date Feb. 1, 2006; Applicant's Reference FPC05068-PCT; 3 pages.

Taiwanese Office Action mailed Nov. 9, 2009 for Application No. 95103378 citing Taiwanese reference Nos. 521450A and 301069A.

U.S. Appl. No. 11/343,178, Office Action dated Jun. 12, 2009, 13 pages.

U.S. Appl. No. 11/343,178, Final Office Action dated Jan. 15, 2010, 11 pages.

De Battisti, A. et al., "Adsorption of Succinonitrile at the Mercury-Aqueous Solution Interface", Journal of Electroanalytical Chemistry, 73, pp. 327-346, 1976.

Canadian Office Action mailed Jan. 8, 2010 for Application No. 2,553,667, 4 pages.

* cited by examiner

ELECTRODE FOR LITHIUM SECONDARY BATTERY

TECHNICAL FIELD

The present invention relates to an electrode including an aliphatic nitrile compound. More particularly, the present invention relates to an electrode whose surface is coated with an aliphatic nitrile compound or which comprises an electrode active material comprising an aliphatic nitrile compound, as well as to a lithium secondary battery having the same electrode.

BACKGROUND ART

In general, a non-aqueous electrolyte comprising a lithium salt such as $LiPF_6$ and a carbonate solvent reacts continuously with the surface of a cathode active material (particularly, $LiCoO_2$) during repeated charge/discharge cycles, resulting in the continuous formation of a resistance layer that causes an increase in resistance and interrupts conduction of $Li^+$ ions. Such resistance layer causes the active material particles to be isolated among themselves or from a current collector (Al foil), thereby detracting from battery performance and life characteristics. Further, such problems increasingly and predominantly occur at a high temperature to accelerate side reactions between an electrolyte and the surface of a cathode when a battery is stored at a high temperature (45° C. or 60° C.) for a long time, resulting in a significant decrease in the lifetime of a battery.

Meanwhile, non-aqueous electrolyte-based secondary batteries have problems related with safety upon overcharge for the following reasons. Cathode active materials such as lithium and/or lithium ion-containing metal oxides capable of lithium ion intercalation/deintercalation are converted into thermally unstable substances due to the release of lithium during overcharge. When the temperature of a battery reaches the critical temperature, oxygen is liberated from such unstable substances and the free oxygen may react with the solvent of an electrolyte, etc., through a highly exothermic reaction mechanism. Therefore, such a series of exothermal reactions by heating results in thermal runaway.

Generally, factors affecting the safety of a battery include: (1) heat emission due to oxidation of electrolytes; and (2) heat emission resulting from the structural collapse of a cathode due to overcharge. When overcharge proceeds, heat emission occurring from the above factors independently or simultaneously causes an increase in the internal temperature of a battery, followed by ignition or explosion of the battery. Thus, batteries show a safety problem upon overcharge.

Meanwhile, when external physical impacts (for example, exposure to high temperature such as a temperature of 150° C. or higher by heating) are applied to a battery while the battery is charged or overcharged, the battery is overheated due to the heat emission caused by the reaction of an inflammable electrolyte with a cathode active material, and the structure of an electrode (particularly, a cathode) is collapsed to generate oxygen, which accelerates the combustion of the electrolyte. Therefore, a separator disposed between a cathode and an anode is melted and the electrical energy induces thermal runaway, resulting in ignition and explosion of the battery.

DISCLOSURE OF THE INVENTION

The present inventors have found that an aliphatic nitrile compound that forms a strong bond with a transition metal or transition metal oxide in an electrode active material can improve the safety of a battery, when the battery is overcharged and/or subjected to physical impacts applied from the exterior of the battery (for example, exposure to high temperature by heating). Meanwhile, we have also recognized a problem in that when an aliphatic dinitrile compound is used as an additive for electrolyte, there is an increase in viscosity of the electrolyte so that diffusion of Li ions cannot be made smoothly under extreme conditions (a low temperature of between −20° C. and −10° C.), resulting in degradation of battery performance at a low temperature.

Therefore, the present invention has been made in view of the above-mentioned problems. It is an object of the present invention to improve the safety of a battery with no degradation of battery performance by incorporating an aliphatic dinitrile compound uniformly into an electrode so that the aliphatic nitrile compound can contribute only to the formation of a complex with an electrode active material.

According to an aspect of the present invention, there is provided an electrode comprising an aliphatic nitrile compound, preferably a compound represented by the following formula 1, whose surface is coated with the aliphatic nitrile compound or which comprises an electrode active material comprising the aliphatic nitrile compound. According to another aspect of the present invention, there is provided a lithium secondary battery having the above-described electrode.

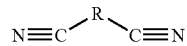

[Formula 1]

wherein R is a C2-C15 alkane.

Preferably, the aliphatic nitrile compound, preferably the compound represented by formula 1 is coated uniformly on the surface of an electrode active material in an electrode.

Additionally, it is preferable that the electrode according to the present invention includes a complex formed between the surface of the electrode active material and the aliphatic nitrile compound.

Hereinafter, the present invention will be explained in more detail.

According to the present invention, the electrode for a lithium secondary battery is characterized by comprising an aliphatic nitrile compound, preferably the compound represented by the above formula 1.

Aliphatic nitrile compounds can form a strong bond with a transition metal or transition metal oxide such as cobalt exposed to the surface of an electrode active material through their cyano functional groups having high dipole moment. Particularly, the cyano functional groups can form a stronger complex on the surface of an electrode active material at a temperature of 45° C. or higher (see, FIG. 1).

An electrode coated with an aliphatic nitrile compound has a strong protection surface that protects the surface of electrode from side reactions with an electrolyte. Therefore, it is possible to accomplish efficient lithium ion intercalation/deintercalation without varying viscosity of the electrolyte and ion conductivity, and to prevent the formation of a resistance layer capable of detracting from battery performance by the reaction of the electrolyte with electrode during repeated charge/discharge cycles, on the surface of electrode. As a result, it is possible to maintain battery performance. Further, according to the present invention, a lithium secondary battery having an electrode uniformly coated with an aliphatic nitrile compound on the surface of an electrode active material, and preferably comprising an aliphatic nitrile compound forming a strong complex with a transition metal and/or transition metal oxide present on the surface of electrode active material, can stabilize the transition metal and transition metal oxide to prevent a partial release of the transition metal from the electrode active material during repeated charge/discharge cycles. In addition, when external physical impacts are applied to a battery (particularly, when a battery is exposed to high temperature such as a temperature of 150° C. or higher), it is possible to efficiently inhibit an exothermic reaction caused by the reaction of an electrolyte directly with the electrode surface and to retard the structural collapse of the electrode active material, thereby preventing ignition and explosion resulting from an increase in temperature inside of the battery. More particularly, because aliphatic nitrile compounds can protect the electrode surface more strongly at a high temperature of 45° C. or higher than room temperature, it is possible to provide thermally stable electrodes.

Although the compound represented by the above formula 1 is exemplified as an aliphatic nitrile compound that can be incorporated into an electrode according to the present invention, another aliphatic nitrile compound having a nitrile group only at one side, compared to the compound represented by formula 1, has a great possibility for providing safety and/or battery performance in such a degree as to be equivalent to the compound represented by formula 1, and thus it is also included in the scope of the present invention.

Meanwhile, alkanes present in the compound represented by formula 1 have no reactivity. Therefore, when the compound represented by formula 1 is incorporated into an electrode, a possibility for an irreversible reaction is low. As a result, addition of the compound represented by formula 1 does not cause degradation in battery performance.

Because an aromatic nitrile compound decomposes at an anode during the initial charge cycle (during formation) to increase irreversible capacity and to degrade battery performance significantly, it is not preferable to incorporate an aromatic nitrile compound into an electrode and to coat an electrode with an aromatic nitrile compound.

Particular examples of the compound represented by formula 1 include succinonitrile ($R=C_2H_4$), glutaronitrile ($R=C_3H_6$), adiponitrile ($R=C_4H_8$), pimelonitrile ($R=C_5H_{10}$), octanedinitrile ($R=C_6H_{12}$), azelonitrile ($R=C_7H_{14}$), sebaconitrile ($R=C_8H_{16}$), 1,9-dicyanononane ($R=C_9H_{18}$), dodecanedinitrile ($R=C_{10}H_{20}$), etc., but are not limited thereto.

Particularly, succinonitrile forms the strongest protection layer among the compounds represented by formula 1. The longer the alkane is, the weaker the protection layer to be formed becomes. Therefore, it is most preferable to use succinonitrile as a coating material among the above compounds.

The aliphatic nitrile compound is present in an electrode preferably in an amount of 0.1-20 wt % based on the weight of electrolyte or 1-10 wt % based on the weight of active material, more preferably in an amount of 10 wt % or less based on the weight of electrolyte or 5 wt % or less based on the weight of active material, and most preferably in an amount of 5 wt % or less based on the weight of electrolyte or 2.5 wt % or less based on the weight of active material.

In order to incorporate an aliphatic nitrile compound into an electrode, a coating solution containing an aliphatic nitrile compound may be applied on an electrode. Otherwise, an aliphatic nitrile compound may be added to slurry for electrode active material to form an electrode.

For the purpose that the nitrile compound participates only in complex formation with a transition metal oxide of an electrode active material, a coating solution containing an aliphatic nitrile compound is applied to an electrode or an aliphatic nitrile compound is added to electrode active material-containing slurry in an adequate amount. Preferably, the electrode or slurry comprising the nitrile compound is treated at a high temperature. Then, the surface of electrode, namely the surface of electrode active material can be protected uniformly with the aliphatic nitrile compound. In addition to the above-mentioned high-temperature treatment applied to an electrode or slurry, a battery may be preferably treated at a high temperature after the assemblage thereof.

The aliphatic nitrile compound is dispersed or dissolved into a solvent to provide a solution, the solution is coated on the surface of an electrode and then the solvent is dried in order to coat the electrode surface, preferably the surface of electrode active material with the aliphatic nitrile compound. The coating method may include dip coating, spray coating, or the like.

There is no particular limitation in selection of the solvent for use in the coating solution containing an aliphatic nitrile compound, as long as the solvent has good compatibility. It is preferable to use, as a solvent for coating solution, non-polar solvents such as THF (tetrahydrofuran) and polar solvents such as NMP (N-methyl-2-pyrrollidone) and carbonate solvents used as a solvent for electrolyte. Although the amount of aliphatic nitrile compound varies with the amount to be coated on an electrode, the aliphatic nitrile compound may be used in the range of between 1:9 and 9:1, expressed in the weight ratio to the solvent.

The method for forming an electrode by adding an aliphatic nitrile compound to slurry for electrode active material includes the steps of: mixing an aliphatic nitrile compound with an electrode active material and other additives such as a binder and conductive agent, as necessary, to form slurry for electrode active material; applying the slurry for electrode active material on a collector; and removing the solvent used in the slurry by drying, etc.

In order to apply the slurry for electrode active material, die coating, roll coating, comma coating and combinations thereof may be used.

Meanwhile, because the compound represented by formula 1 starts to be slightly volatilized at a high temperature of 100° C. or higher and then be substantially evaporated without leaving residues at a temperature of about 150° C., it is necessary to maintain an adequate drying temperature, drying rate and vent flow for the purpose of coating an electrode smoothly with the compound represented by formula 1 from slurry containing NMP as a solvent.

To prevent the compound represented by formula 1 from being volatilized and to remove residual NMP, the drying temperature preferably ranges from 90° C. to 110° C. The drying rate is preferably 3 m/min or less, more preferably 2 m/min or less, but may be varied with the length of a drying furnace and the drying temperature of slurry. The vent flow is preferably 2000-3000 rpm.

More particularly, when the electrode comprising the compound represented by formula 1 is dried at an excessively low temperature in order to retain the compound in the electrode, NMP content and water content in the electrode increase, thereby causing a problem in that battery performance is degraded. On the other hand, when the electrode is dried at an excessively high temperature, NMP content in the electrode decreases but the compound represented by formula 1 is substantially volatilized, and thus it is not possible to obtain a uniformly coated electrode. Therefore, it is important that the drying temperature, drying rate and vent flow are maintained within the above ranges.

Meanwhile, it is preferable that aliphatic nitrile compounds form a complex with the surface of an electrode active material. Preferably, for the purpose of forming a complex, an electrode comprising an electrode active material whose surface is coated with an aliphatic nitrile compound is further treated at a high temperature. Particularly, the high-temperature treatment may be performed at such a temperature range as not to affect the electrode active material and binder, generally at a temperature of 180° C. or lower. Otherwise, although the high-temperature treatment varies with the kind of the aliphatic nitrile compound, it may be performed at such a temperature range as to prevent evaporation of the aliphatic nitrile compound, generally at a temperature of 120° C. or lower. In general, the high-temperature treatment is suitably performed at a temperature of between 60° C. and 90° C. Long-time storage at a temperature of between 30° C. and 40° C. may result in the same effect.

As a cathode active material for use in electrodes, lithium-containing transition metal oxides may be used. The cathode active material can be at least one selected from the group consisting of $LiCoO_2$, $LiNiO_2$, $LiMn_2O_4$, $LiMnO_2$ and $LiNi_{1-x}Co_xO_2$ (wherein $0<X<1$). Meanwhile, as an anode active material for use in electrodes, carbon, lithium metal or lithium alloy may be used. In addition, other metal oxides capable of lithium intercalation/deintercalation and having an electric potential of 2V or less based on lithium (for example, $TiO_2$ and $SnO_2$) may be used as an anode active material.

Slurry for electrodes may further comprise a binder, conductive agent, viscosity controller, supplementary binder, etc., in addition to active materials.

Any conventional collectors made of conductive materials can be used with no particular limitation. More particularly, collectors made of metals such as iron, copper, aluminum and nickel are widely used.

A lithium secondary battery, to which the electrode comprising an aliphatic nitrile compound according to the present invention may be applied, can comprise:

(1) a cathode capable of lithium ion intercalation/deintercalation;
(2) an anode capable of lithium ion intercalation/deintercalation;
(3) a porous separator; and
(4) a) a lithium salt; and
b) an electrolyte compound.

Non-aqueous electrolytes for lithium secondary batteries generally include flammable non-aqueous organic solvents including cyclic carbonates and/or linear carbonates. Particular examples of cyclic carbonates that may be used in the present invention include ethylene carbonate (EC), propylene carbonate (PC), gamma-butyrolactone (GBL), etc. Typical examples of linear carbonates include diethyl carbonate (DEC), dimethyl carbonate (DMC), ethylmethyl carbonate (EMC).

When the electrode comprising an aliphatic nitrile compound according to the present invention is used, it is possible to inhibit thermal runaway and to improve safety of batteries without causing degradation in battery performance even if such conventional flammable non-aqueous organic solvents are used as electrolytes.

Non-aqueous electrolytes comprise lithium salts such as $LiClO_4$, $LiCF_3SO_3$, $LiPF_6$, $LiBF_4$, $LiAsF_6$, $LiN(CF_3SO_2)_2$, etc.

The lithium secondary battery according to the present invention may have a cylindrical, prismatic or pouch-like shape.

BEST MODE FOR CARRYING OUT THE INVENTION

Figure 1:
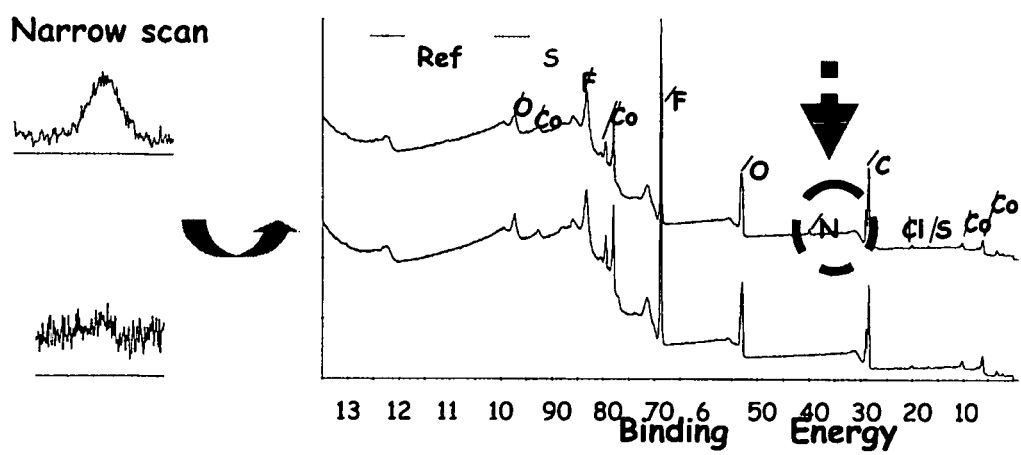
FIG. 1 is a graph showing XPS (X-ray photoelectron spectroscopy) data of the cathodes in the batteries obtained from Example 1 and Comparative Example 1.

Reference will now be made in detail to the preferred embodiments of the present invention. It is to be understood that the following examples are illustrative only and the present invention is not limited thereto.

EXAMPLES

Example 1

Succinonitrile was diluted with acetone as a solvent in the weight ratio of 3:7 to provide a solution, into which a cathode was dipped. Then, the cathode was high-temperature treated at 30° C. for 2 days to evaporate the solvent, thereby providing a cathode comprising succinocitrile forming a complex with the surface of cathode active material. The cathode active material was $LiCoO_2$. Artificial graphite was used as an anode active material. The electrolyte used in this example was 1M $LiPF_6$ solution formed of EC:PC:DEC=3:2:5. A 383562-type lithium polymer battery was manufactured by using a conventional method and the battery was packed with an aluminum laminate packaging material to provide a battery pack. Next, the battery was aged by treating it again at a high temperature of 60° C. for 12 hours or more so that any unreacted and/or residual succinonitrile in the electrode can form a complex.

Examples 2-8

Example 1 was repeated to provide lithium polymer batteries, except that glutaronitrile (R=$C_3H_6$) (Example 2), adiponitrile (R=$C_4H_8$) (Example 3), pimelonitrile (R=$C_5H_{10}$) (Example 4), octanedinitrile (R=$C_6H_{12}$) (Example 5), azelonitrile (R=$C_7H_{14}$) (Example 6), sebaconitrile (R=$C_8H_{16}$) (Example 7) and dodecanedinitrile (R=$C_{10}H_{20}$) (Example 8) were used, instead of succinonitrile (R=$C_2H_4$).

Comparative Example 1

Example 1 was repeated to provide a lithium polymer battery, except that the cathode was not dipped into the aliphatic nitrile compound-containing solution.

Comparative Example 2

1M $LiPF_6$ solution formed of EC:EMC=1:2 was used as an electrolyte, to which 3 wt % of succinonitrile (R=$C_2H_4$) was added. Artificial graphite and $LiCoO_2$ were used as an anode active material and cathode active material, respectively, to provide a 523450-type prismatic lithium battery according to a conventional method. Next, the battery was aged at a high temperature of 60° C. for 12 hours or more.

Example 9

A cathode was dipped into a solution containing succinonitrile (R=$C_2H_4$) in a acetone as a solvent, and then was high-temperature treated at 30° C. for 2 days to evaporate the solvent, thereby providing a cathode comprising 3-5 wt % of succinocitrile, based on the weight of electrolyte, forming a complex with the surface of cathode active material. The cathode active material was $LiCoO_2$. The electrolyte used in this example was 1M $LiPF_6$ solution formed of EC:EMC=1:2. Artificial graphite was used as an anode active material. A 523450-type prismatic lithium battery was manufactured by using a conventional method. Next, the battery was aged by treating it again at a high temperature of 60° C. for 12 hours or more so that any unreacted and/or residual succinonitrile in the electrode can form a complex.

Comparative Examples 3-10

The electrolyte used in these examples was 1M $LiPF_6$ solution formed of EC:EMC=1:2. To the above electrolyte, succinonitrilte (R=$C_2H_4$) (Comparative Example 3), glutaronitrile (R=$C_3H_6$) (Comparative Example 4), adiponitrile (R=$C_4H_8$) (Comparative Example 5), pimelonitrile (R=$C_5H_{10}$) (Comparative Example 6), octanedinitrile (R=$C_6H_{12}$) (Comparative Example 7), azelonitrile (R=$C_7H_{14}$) (Comparative Example 8), sebaconitrile (R=$C_8H_{16}$) (Comparative Example 9) and dodecanedinitrile (R=$C_{10}H_{20}$) (Comparative Example 10) were added, each in the amount of 3 wt %. Artificial graphite and $LiCoO_2$ were used as an anode active material and cathode active material, respectively. 383562 type lithium polymer batteries were manufactured by using a conventional method and the batteries were packed with aluminum laminate packaging materials to provide battery packs. Next, the batteries were aged at a high temperature of 60° C. for 12 hours or more.

Examples 10-17

Cathodes were dipped into solutions, each containing succinonitrile (R=$C_2H_4$) (Example 10), glutaronitrile (R=$C_3H_6$) (Example 11), adiponitrile (R=$C_4H_8$) (Example 12), pimelonitrile (R=$C_5H_{10}$) (Example 13), octanedinitrile (R=$C_6H_{12}$) (Example 14), azelonitrile (R=$C_7H_{14}$) (Example 15), sebaconitrile (R=$C_8H_{16}$) (Example 16) and dodecanedinitrile (R=$C_{10}H_{20}$) (Example 17). Then each cathode was high-temperature treated at 30° C. for 2 days to evaporate the solvent, thereby providing a cathode whose surface was coated with 3-5 wt % of each aliphatic nitrile compound (based on the weight of electrolyte). The cathode active material was $LiCoO_2$.

The electrolyte used in these examples was 1M $LiPF_6$ solution formed of EC:EMC=1:2. Artificial graphite was used as an anode active material. 383562 type lithium polymer batteries were manufactured by using a conventional method and the batteries were packed with aluminum laminate packaging materials to provide battery packs. Next, the batteries were aged at a high temperature of 60° C. for 12 hours or more.

Example 18

To cathode slurry containing $LiCoO_2$ as a cathode active material, Super-p as a conductive agent, PVDF homopolymer as a binder and NMP as a solvent, 5 wt % of succinonitrile based on the weight of electrolyte (2.5 wt % of succinonitrile based on the weight of cathode active material) was added and then stirred. The mixed slurry was applied on a collector and vacuum dried at about 100° C. for 24 hours or more so as to prevent the evaporation of succinonitrile at the highest degree and to remove residual NMP. Further, the drying rate (2 m/min) and vent flow (2100 rpm) were dropped as low as possible so that the slurry can be coated smoothly on the current collector. By doing so, a cathode that comprises succinonitrile forming a complex with the surface of cathode active material and is coated uniformly with succinocitrile was obtained.

Artificial graphite was used as an anode active material. 1M $LiPF_6$ solution formed of EC:PC:DEC=3:2:5 was used as an electrolyte, to which 1 wt % of VC was added. A 323456-type lithium polymer battery was manufactured by using a conventional method and the battery was packed with an aluminum laminate packaging material to provide a battery pack. Next, the battery was aged by treating it again at a high temperature of 60° C. for 12 hours or more so that any unreacted and/or residual succinonitrile in the electrode can form a complex.

Comparative Example 11

Example 18 was repeated to provide a lithium polymer battery, except that no aliphatic nitrile compound was added to the cathode slurry.

EXPERIMENTAL RESULTS

1. Test for Formation of Ligands on Cathode Surface

Each battery obtained from Example 1 and Comparative Example 1 was fully charged to 4.2V and each cathode was separated from each battery to prepare a sample of 1 cm×1 cm size. Additionally, each sample was cleaned with dimethyl carbonate (DMC) to remove impurities remaining on the surface and then was tested for checking the formation of ligands by using a general surface analyzing apparatus based on XPS (X-ray photoelectron spectroscopy). The XPS apparatus (ESCALAB 250) used in this test is one that shows constitutional elements forming a surface by detecting specific binding energy and kinetic energy of atoms and reading atomic information to the depth of several nanometers from the surface. Complex formation for the electrode comprising a nitrile compound was checked through a peak corresponding to the formation of nitrogen atoms. As shown in FIG. 1, nitrogen atoms were not detected on the surface of cathode in the case of the battery (Comparative Example 1) using no succinonitrile. On the other hand, in the case of the battery (Example 1) using succinonitrile, nitrogen atoms were clearly detected by the presence of a strong bond formed between succinonitrile and cobalt transition metal or metal oxide in the cathode active material. The above XPS results indicate that a cyano functional group was bonded to cobalt metal or metal oxide to form a complex on the surface.

From the result, it could be expected that an aliphatic nitrile additive could form a strong complex with the surface of cathode active material, thereby inhibiting side reactions generated from the battery during repeated charge/discharge cycles.

2. Test for Heat Emission Control

Each battery obtained from Examples 1-8 and Comparative Example 1 was charged to 4.2V. A general thermogravimetric analyzer, DSC (Differential Scanning Calorimeter) was used, wherein two high-pressure pans resistant to vapor pressure of the electrolyte were used as pans for measurement. To one pan, about 5-10 mg of the cathode sample separated from each of the batteries according to Examples 1-8 and Comparative Example 1 was introduced, while the other pan was left empty. Calorific difference between two pans was analyzed while the pans were heated at a rate of 5° C./min to 350° C. to measure temperature peaks where heat emission occurs.

Figure 2:
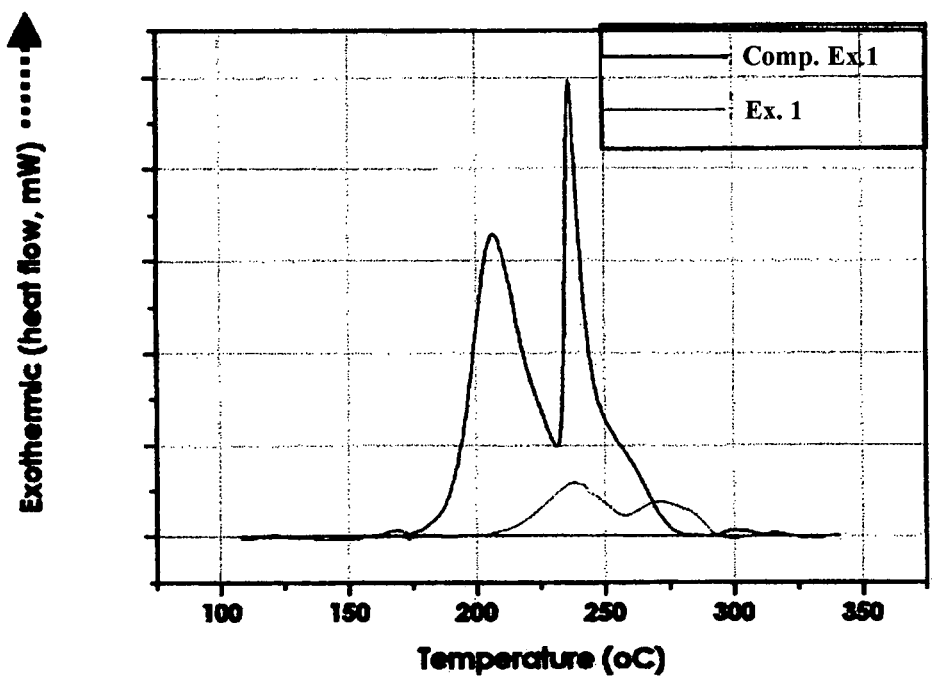
FIG. 2 is a graph showing the heat emission peaks and the results of heat emission control for the cathodes in the batteries obtained from Example 1 and Comparative Example 1.
Figure 3:
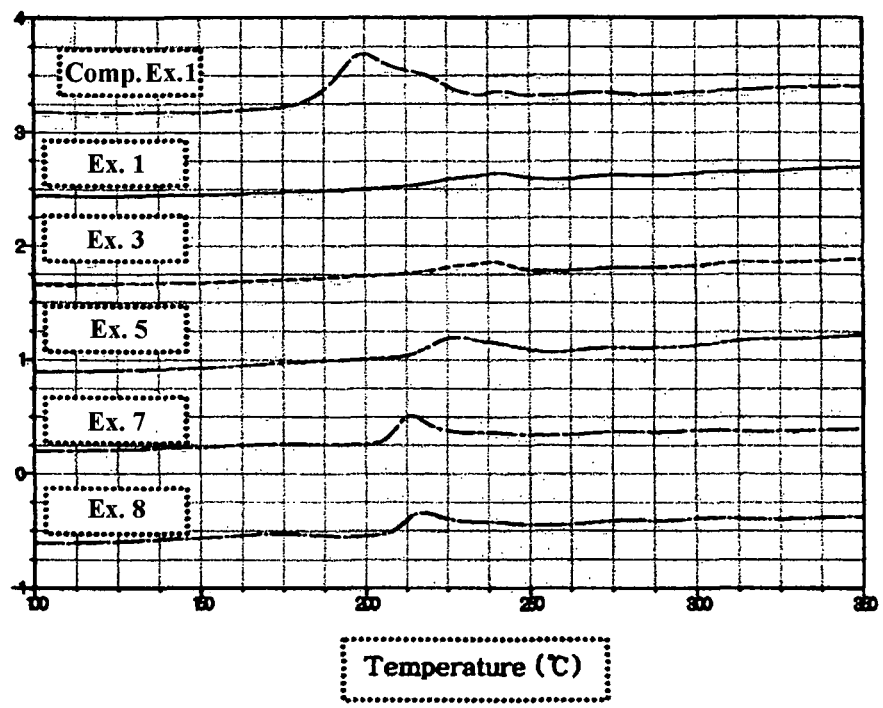
FIG. 3 is a graph showing the heat emission peaks and the results of heat emission control for the cathodes in the batteries obtained from Comparative Example 1 and Examples 1, 3, 5, 7 and 8.
Figure 4:
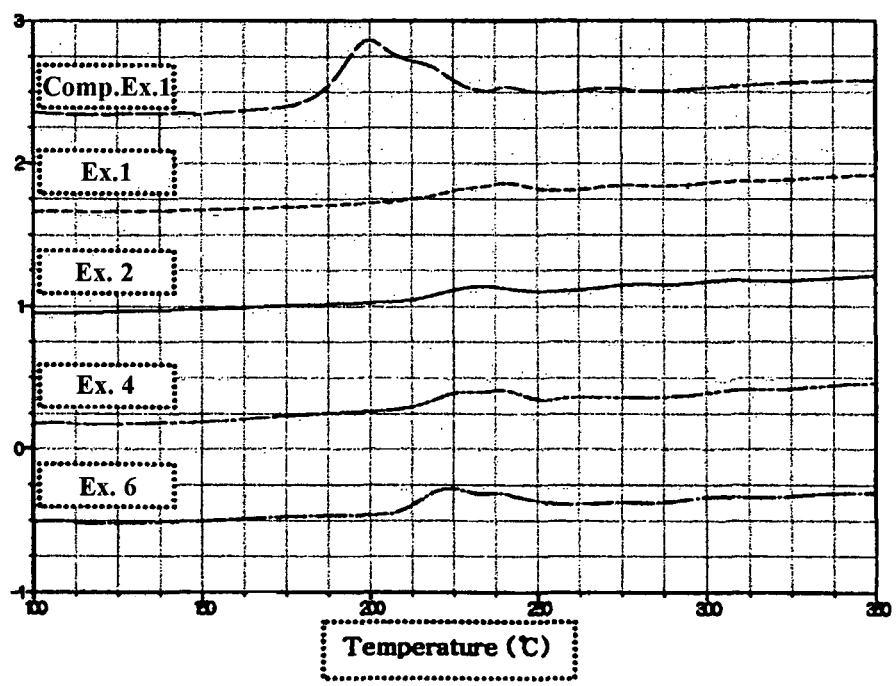
FIG. 4 is a graph showing the heat emission peaks and the results of heat emission control for the cathodes in the batteries obtained from Comparative Example 1 and Examples 1, 2, 4 and 6.
Figure 5:
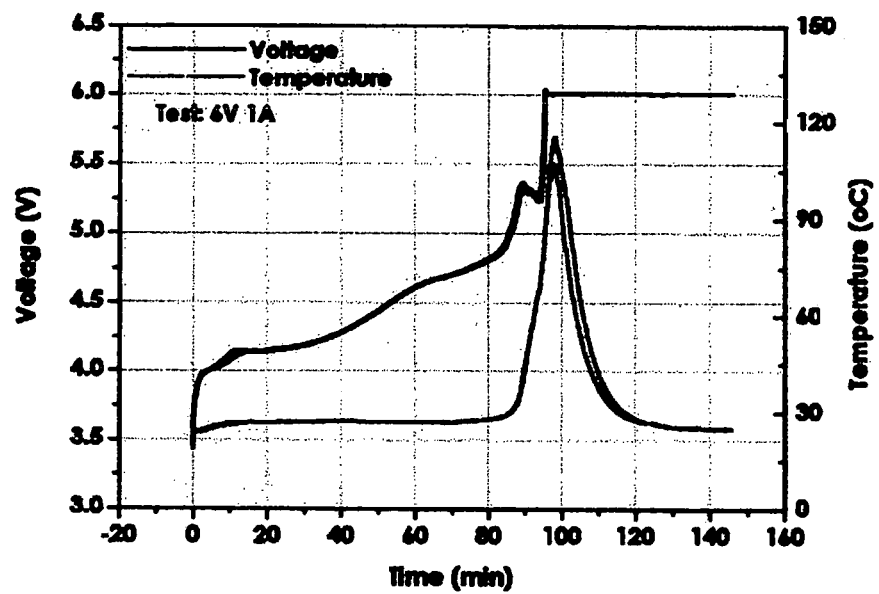
FIG. 5 is a graph showing the results of an overcharge test for the battery obtained in Example 1 under the condition of 6V/1A (voltage, temperature).

As shown in FIG. 2, the battery (Comparative Example 1) using the electrode comprising no aliphatic nitrile compound shows heat emission peaks at about 200° C. and 240° C. The peak at about 200° C. indicates heat emission caused by the reaction between the electrolyte and cathode, while the peak at about 240° C. indicates heat emission caused by combined factors including the reaction between the electrolyte and cathode and the structural collapse of the cathode. On the contrary, as shown in FIGS. 2, 3 and 4, each battery using the electrode comprising succinonitrile ($R=C_2H_4$) (Example 1), glutaronitrile ($R=C_3H_6$) (Example 2), adiponitrile ($R=C_4H_8$) (Example 3), pimelonitrile ($R=C_5H_{10}$) (Example 4), octanedinitrile ($R=C_6H_{12}$) (Example 5), azelonitrile ($R=C_7H_{14}$) (Example 6), sebaconitrile ($R=C_8H_{16}$) (Example 7) or dodecanedinitrile ($R=C_{10}H_{20}$) (Example 8) does not show the above two temperature peaks. This indicates that it was possible to inhibit heat emission caused by the reaction between the electrolyte and cathode and structural collapse of the cathode, in the case of the batteries according to the present invention.

3. Overcharge Test

Figure 6:
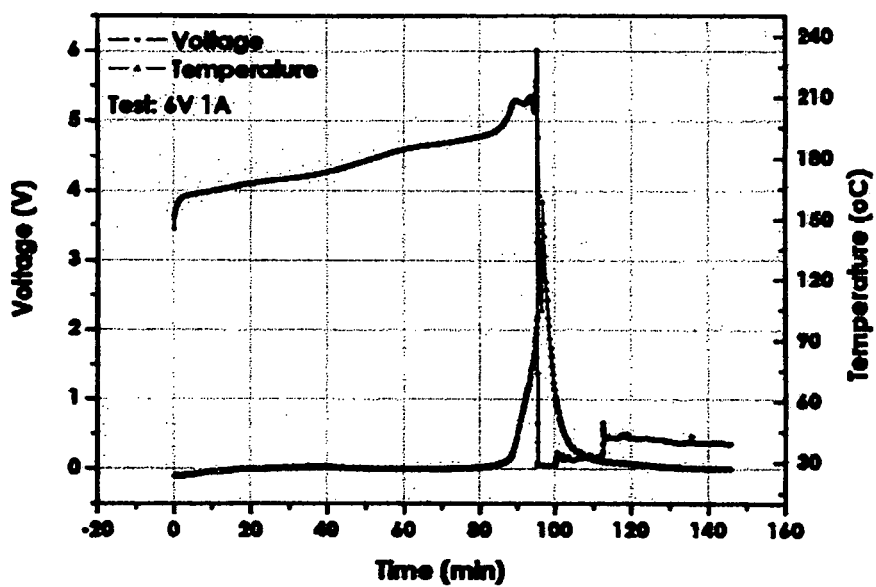
FIG. 6 is a graph showing the results of an overcharge test for the battery obtained in Comparative Example 1 under the condition of 6V/1 A (voltage, temperature)
Figure 7:
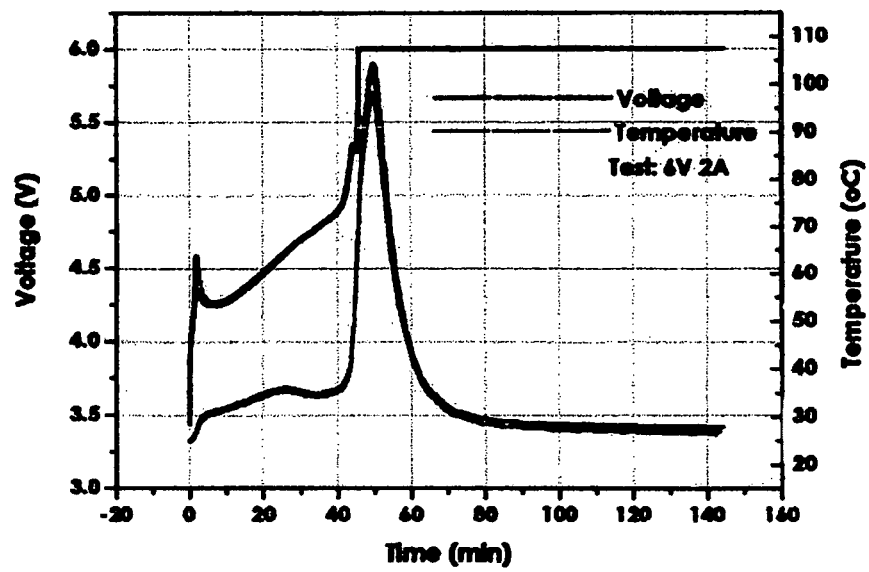
FIG. 7 is a graph showing the results of an overcharge test for the battery obtained in Example 1 under the condition of 6V/2 A (voltage, temperature).
Figure 8:
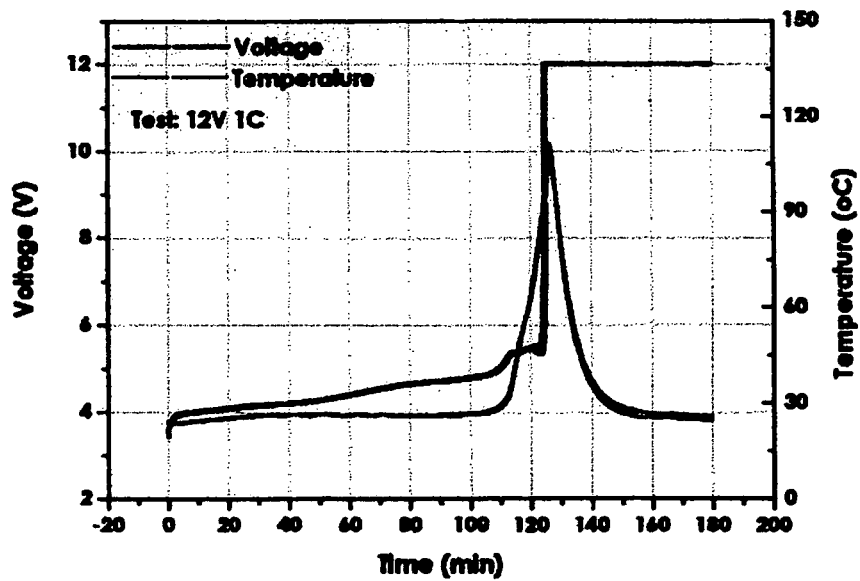
FIG. 8 is a graph showing the results of an overcharge test for the battery obtained in Example 1 under the condition of 12V/1 C (voltage, temperature).
Figure 9:
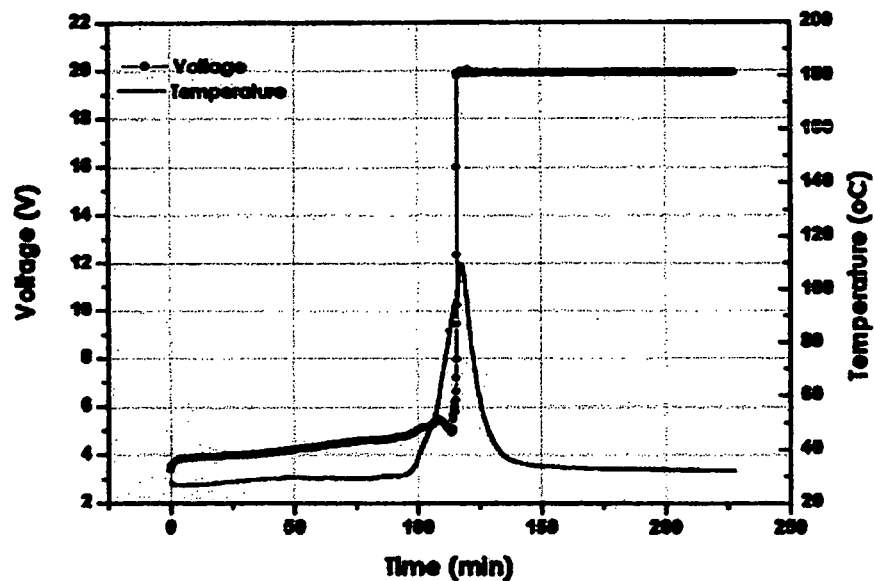
FIG. 9 is a graph showing the results of an overcharge test for the battery obtained in Example 1 under the condition of 20V/1 C (voltage, temperature).

Each battery obtained from Example 1 and Comparative Example 1 was tested under the overcharge conditions of 6V/1 A, 6V/2 A, 12V/1 C and 20V/1 C in a CC/CV (Constant Current/Constant Voltage) manner. The test results including variation in temperatures are shown in FIGS. 5-9. As shown in FIGS. 5-9, the battery according to Example 1 shows more improved safety compared to the battery according to Comparative Example 1 (test results for the battery according to Comparative Example 1 are shown in FIG. 6 only for the test condition of 6V/1 A and the others are not shown).

Particularly, as can be seen from the peak temperature in FIG. 6 (Comparative Example 1), the battery was fired and subjected to short circuit at a measuring temperature of 200° C. or higher due to the oxidation of electrolyte present in the battery and the exothermic reaction resulting from the structural collapse of the cathode. On the contrary, the secondary battery using the electrode comprising succinonitrile (Example 1) shows a peak temperature of about 100° C. This indicates that exothermic reactions were inhibited in the battery according to Example 1.

The above overcharge test was repeated many times and the average values for the test results are shown in the following Table 1.

TABLE 1

|  | 6 V/1 A | 6 V/2 A | 12 V/1 C | 20 V/1 C |
| --- | --- | --- | --- | --- |
| Ex. 1 | PASS | PASS | PASS | PASS |
| Comp. Ex. 1 | FIRE | FIRE | FIRE | FIRE |

4. Hot Box Test

Each battery obtained from Example 1 and Comparative Example 1 was fully charged. The charged batteries were introduced into an oven capable of convection and heated at a rate of 5° C./min from room temperature to 160° C. and 170° C. Then the batteries were exposed to such high temperatures for 1 hour to check whether they are fired or not.

Figure 10:
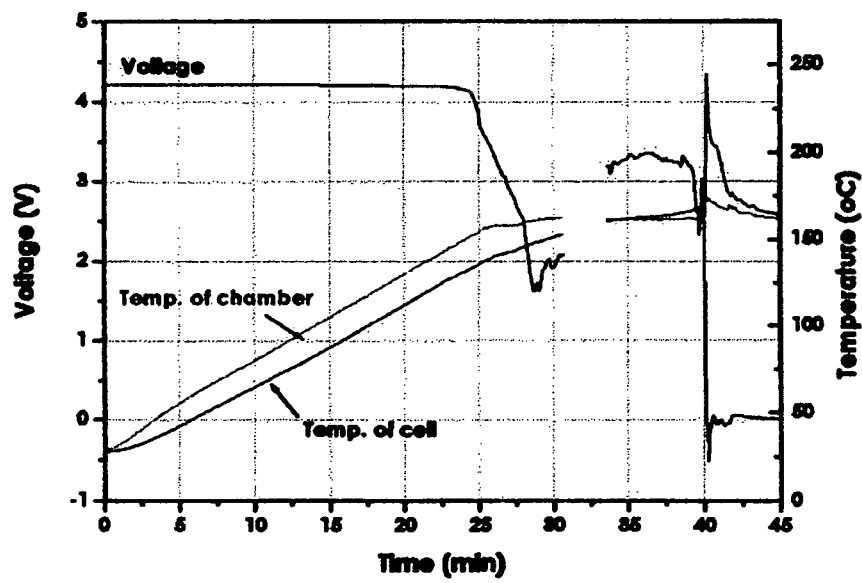
FIG. 10 is a graph showing the results of a 160° C.-high temperature exposure test for the battery obtained in Comparative Example 1 (voltage, temperature).
Figure 11:
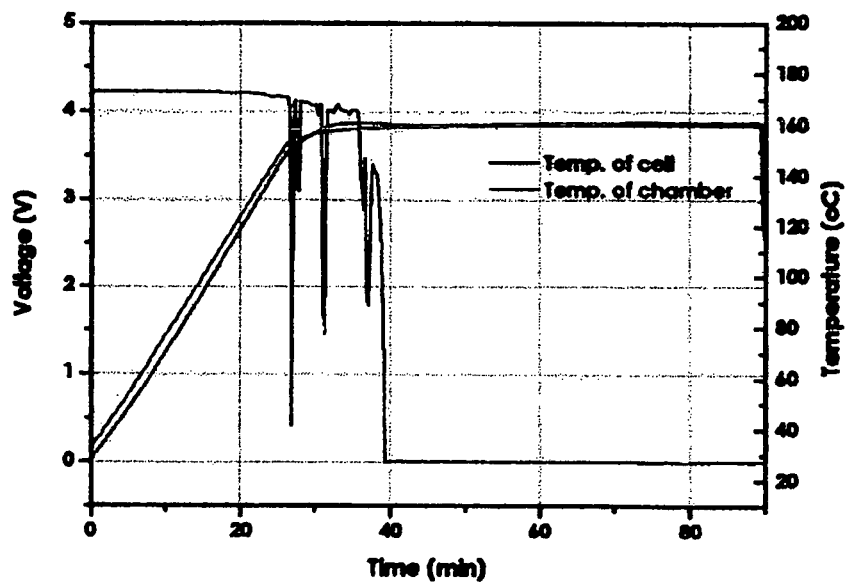
FIGS. 11 and 12 are graphs showing the results of 160° C.- and 170° C.-high temperature exposure tests for the battery obtained in Example 1 (voltage, temperature).
Figure 12:
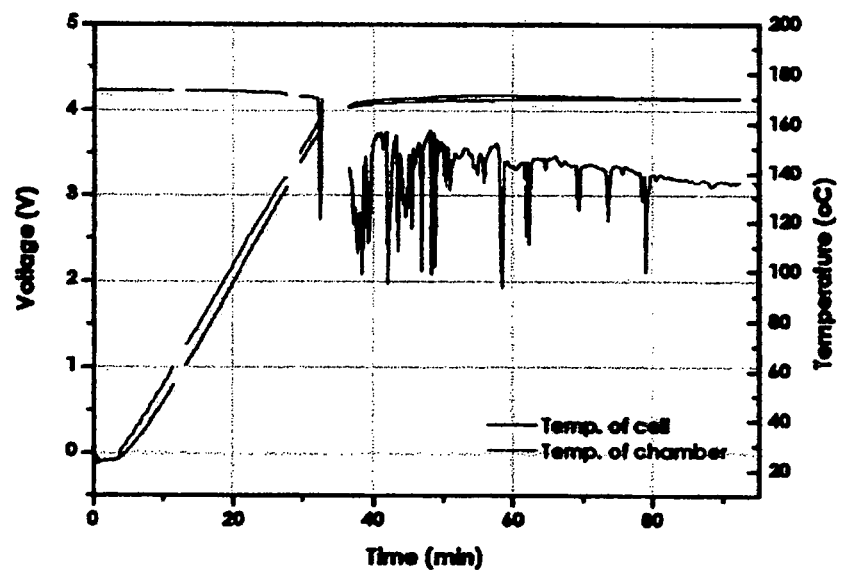

The battery according to Comparative Example 1 was fired at 160° C. when heated at a rate of 5° C./min (FIG. 10), while the battery according to Example 1 was not fired under the same condition (FIGS. 11 and 12).

5. Test for Battery Performance (1)

Figure 13:
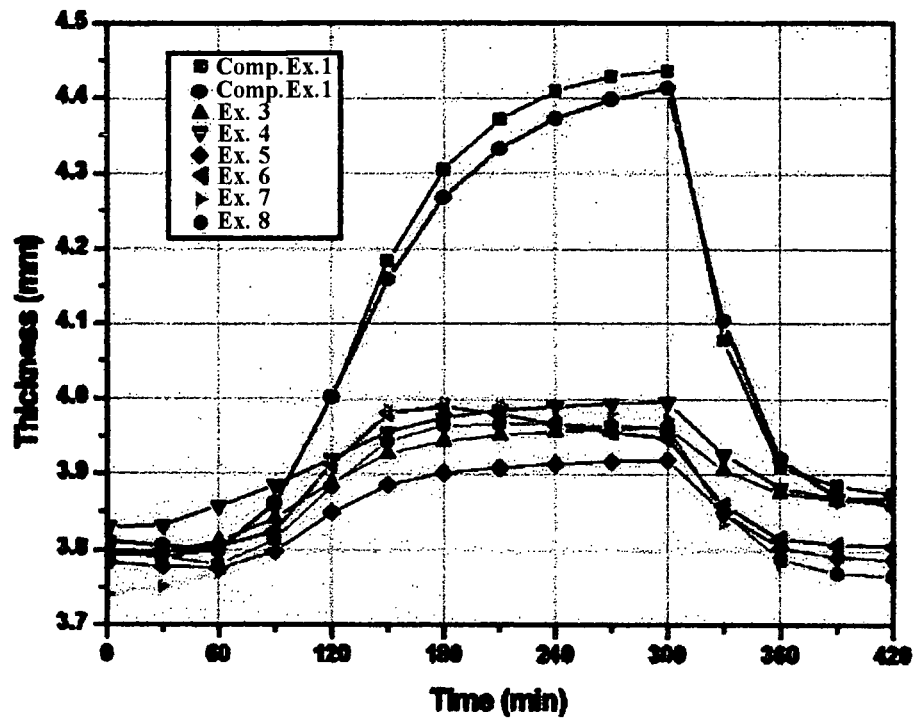
FIG. 13 is a graph showing the results obtained by measuring the variation in battery thickness after each battery according to Examples 3-8 and Comparative Examples 1 and 2 was exposed to a high temperature of 90° C. for 4 hours.

Each battery obtained from Examples 1-8 and Comparative Example 1 was exposed to a high temperature of 90° C. for 4 hours and subjected to a bulge test for measuring a change in thickness of the battery. The test results are shown in FIG. 13. Although the results for Examples 1 and 2 are not shown in FIG. 13, the batteries according to Example 1 and 2 showed a significantly decreased change in thickness, compared to the battery of Comparative Example 1. As shown in FIG. 13, the batteries according to Examples 3-8 showed excellent high-temperature stability with substantially no change in thickness.

Changes in thickness of a battery may result from safety of an electrolyte, decomposition at a high temperature, reaction between a cathode surface and electrolyte, etc. Alkanes having dinitrile functional groups used in the present invention provide excellent effect in high-temperature storage.

Therefore, as shown in FIG. 13, electrodes comprising aliphatic dinitrile compounds provide excellent thermal stability.

6. Test for Battery Performance (2)

The battery according to Comparative Example 2 was compared to the battery according to Example 9 in terms of low-temperature performance. Each battery fully charged to 4.2V was discharged to 3V at a current of 1° C. (950 mA) in a constant current (CC) manner at −10° C. to measure the low-temperature performance. The results are shown in FIG. 14.

Figure 14:
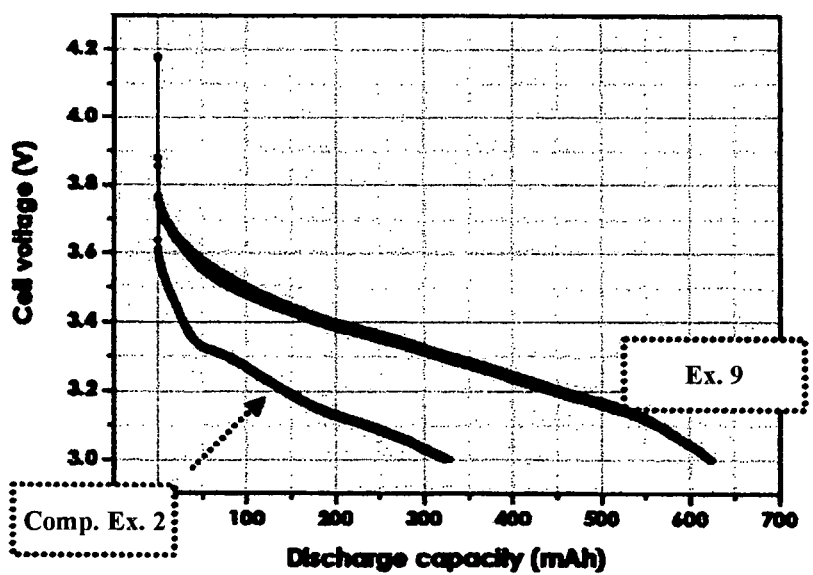
FIG. 14 is a graph showing the battery performance at a low temperature for the battery according to Example 9 compared to the battery according to Comparative Example 2.

As shown in FIG. 14, both batteries show a significant difference in terms of −10° C. discharge capacity.

As can be seen from FIG. 14, in the case of the battery (Comparative Example 2) using an aliphatic nitrile compound added to the electrolyte, there is a problem in that the additive increases the viscosity of electrolyte to reduce the diffusion of Li ions, resulting in degradation in the battery performance. On the other hand, in the case of the battery (Example 9) using the cathode coated with an aliphatic nitrile compound, there is an advantage in that the battery safety can be improved with no degradation in the battery performance by virtue of the formation of a chemically strong complex between the nitrile functional group and the cathode, even if the content of the aliphatic nitrile compound is equal to or greater than the amount thereof added to the electrolyte.

Meanwhile, each battery according to Comparative Examples 3-10 and Examples 10-17, fully charged to 4.2V, was discharged to 3V at a current of 1 C (750 mA) in a constant current (CC) manner at −10° C. to measure the low-temperature performance. The results are shown the following Table 2.

TABLE 2

|  | 1 C, −10° C. (mAh) | Efficiency (%) |
| --- | --- | --- |
| Examples 10-17 | 630.5 | 83.0 |
| Comp. Ex. 3 | 575.6 | 75.7 |
| Comp. Ex. 4 | 540.5 | 71.1 |
| Comp. Ex. 5 | 568.7 | 74.8 |
| Comp. Ex. 6 | 595.8 | 78.4 |
| Comp. Ex. 7 | 597.0 | 78.5 |
| Comp. Ex. 8 | 560.9 | 73.8 |
| Comp. Ex. 9 | 594.1 | 78.2 |
| Comp. Ex. 10 | 555.1 | 73.0 |

As can be seen from Table 2, when 383562-type lithium polymer batteries according to Comparative Examples 3-10 and Examples 10-17 were tested in terms of low-temperature performance, the batteries (Examples 10-17) using the cathode coated with 3 wt % or more of an aliphatic nitrile compound shows excellent battery performance compared to the batteries (Comparative Examples 3-10) using 3 wt % of an aliphatic nitrile compound as an additive for electrolyte, in the same manner as the 523450 type prismatic lithium batteries according to Comparative Example 2 and Example 9.

Additionally, in the case of the batteries according to Examples 10-17, most of the batteries show an efficiency of 83% or more regardless of the kind of aliphatic nitrile compound. On the other hand, in the case of the batteries (Comparative Examples 3-10) using an aliphatic nitrile compound as an additive for electrolyte show a difference in efficiency ranging from 71% to 78% depending on the differences in physical properties of the additive, viscosity and Li ion diffusion.

7. Test for Battery Performance (3)

Each of the batteries according to Comparative Example 2 and Example 9 was stored at a high temperature (90° C., 4 hours) and then tested for the interfacial resistance in the battery.

To measure the interfacial resistance, the battery fully charged to 4.2V was tested under the conditions of a DC voltage of 0V based on an open circuit, an AC amplitude of 5 mV and a frequency ranging from 105 (Hz) to $10^{-1}$ (Hz). Additionally, the Nyquist presentation method was used wherein Z' (real number part) and −Z" (imaginary number part) are shown in the x-axis and y-axis, respectively. The results are shown in FIG. 15.

Figure 15:
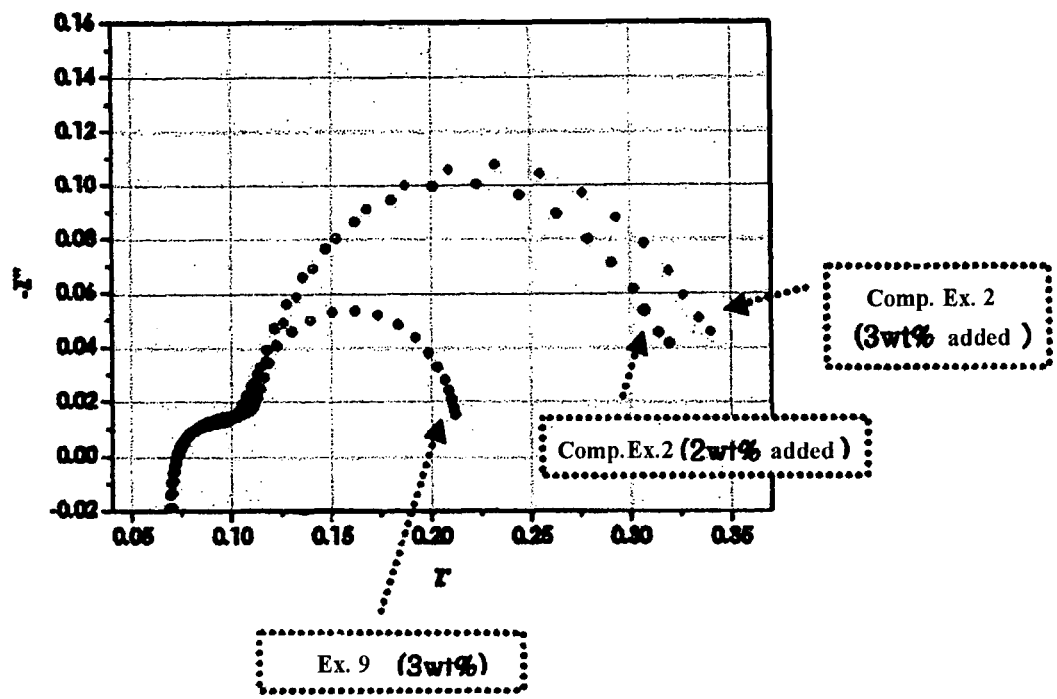
FIG. 15 is a graph showing interfacial resistance values of each battery according to Comparative Example 2 and Example 9 after storing each battery at a high temperature.

As shown in FIG. 15, the battery according to Comparative Example 2 shows an increase in interfacial resistance as the content of the aliphatic nitrile compound added to the electrolyte increases. On the other hand, the battery (Example 9) using the cathode coated with 3 wt % of the aliphatic nitrile compound, obtained by dipping a cathode into the coating solution containing the aliphatic nitrile compound, shows a significantly low interfacial resistance.

Therefore, it is possible to improve battery safety with no degradation in battery performance when the aliphatic nitrile compound is not added to an electrolyte but is incorporated into an electrode.

8. Test for Battery Performance (4)

Each battery obtained from Example 18 (using a cathode coated with succinonitrile) and Comparative Example 11 (using a non-coated cathode) was subjected to charge/discharge cycles in a hot chamber at 45° C. with a constant current (1 C/1 C).

Figure 16:
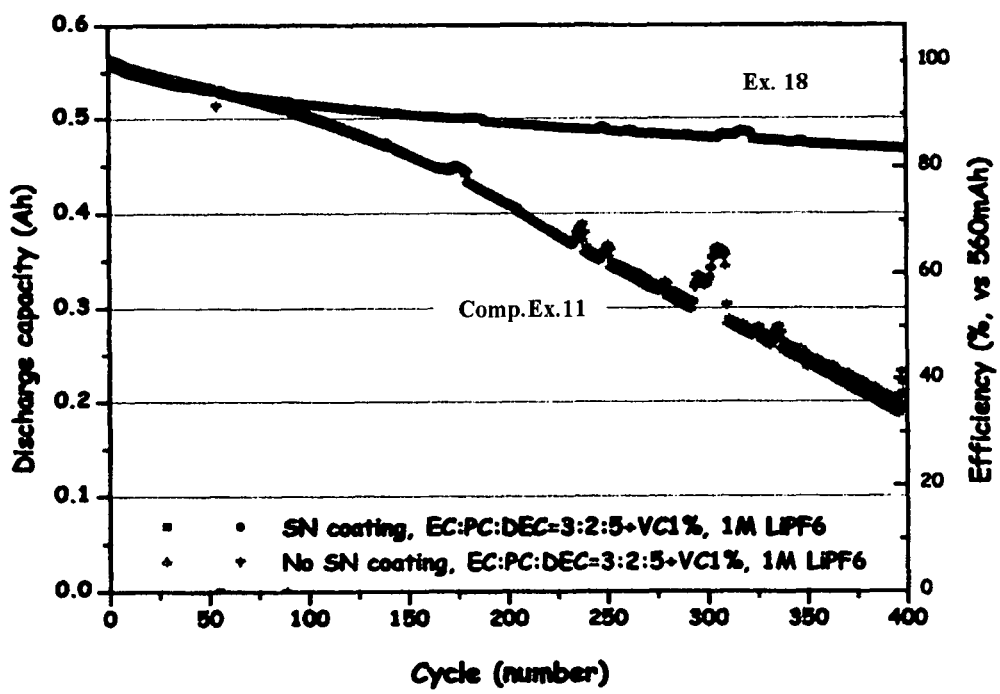
FIG. 16 is a graph showing cycle characteristics of the batteries according to Example 18 and Comparative Example 11 at 45° C.

As shown in FIG. 16, there is a significant difference between the battery (Example 18) using a cathode coated with succinonitrile and the battery (Comparative Example 11) using a non-coated cathode, in terms of high-temperature life characteristics. When compared to the battery according to Comparative Example 11, the battery according to Example 18 shows a less decrease in discharge capacity during repeated charge/discharge cycles, thereby providing improved life characteristics. On the other hand, the battery according to Comparative Example 11 shows a significant decrease in discharge capacity during repeated charge/discharge cycles.

INDUSTRIAL APPLICABILITY

As can be seen from the foregoing, the battery using an electrode comprising an aliphatic nitrile compound according to the present invention can inhibit heat emission caused by the reaction of an electrolyte with a cathode and the structural collapse of a cathode, and can reduce the calorific value due to the heat emission. Therefore, it is possible to prevent a battery from being fired due to the generation of internal short circuit resulting from an excessive heat emission upon overcharge. Further, it is possible to avoid degradation in battery performance including problems of an increase in electrolyte viscosity and an increase in interfacial resistance, occurring when an aliphatic nitrile compound is added to an electrolyte.

Additionally, the compound represented by formula 1 used in the present invention will not be reduced easily during the charge cycle of a battery and will not be decomposed easily even under high voltage. Therefore, it is possible to inhibit the structural collapse of a cathode efficiently as well as to improve the performance and safety of a battery due to the electrochemical stability of the compound.

The invention claimed is:

1. An electrode comprising:
a protective layer comprising an aliphatic nitrile compound-electrode active material complex,
wherein the protective layer is on a surface of the electrode active material,
wherein the protective layer comprises a ligand-metal bond between the electrode active material and the aliphatic nitrile compound, and
wherein the aliphatic nitrile compound is present in an amount of 1-5 weight percent, based on the total weight of the electrode active material.

2. The electrode according to claim 1, wherein the aliphatic nitrile compound is represented by the following formula 1:

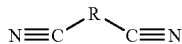

[Formula 1]

wherein R is C2-C15 alkylene.

3. The electrode according to claim 1, which is obtained by adding the aliphatic nitrile compound to slurry for electrode active material.

4. The electrode according to claim 3, which is obtained by coating the electrode active material slurry containing the aliphatic nitrile compound on a collector and drying the slurry at a controlled temperature of between 90° C. and 110° C.

5. The electrode according to claim 3, which is obtained by coating the electrode active material slurry containing the aliphatic nitrile compound on a collector and drying the slurry at a controlled drying rate of 3 m/min or less under a controlled vent flow of 2000-3000 rpm.

6. The electrode according to claim 1, which is treated at a high temperature of 30-90° C. before or after assemblage of a battery.

7. A lithium secondary battery comprising a cathode and an anode, wherein the cathode is the electrode as defined in claim 1.

8. The lithium secondary battery according to claim 7, wherein the aliphatic nitrile compound is represented by the following formula 1:

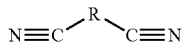

[Formula 1]

wherein R is C2-C15 alkylene.

9. The lithium secondary battery according to claim 7, wherein the electrode is obtained by adding the aliphatic nitrile compound to slurry for electrode active material.

10. The lithium secondary battery according to claim 9, wherein the electrode is obtained by coating the electrode active material slurry containing the aliphatic nitrile compound on a collector and drying the slurry at a controlled temperature of between 90° C. and 110° C.

11. The lithium secondary battery according to claim 9, wherein the electrode is obtained by coating the electrode active material slurry containing the aliphatic nitrile compound on a collector and drying the slurry at a controlled drying rate of 3 m/min or less under a controlled vent flow of 2000-3000 rpm.

12. The lithium secondary battery according to claim 7, wherein the electrode of the battery is treated at a high temperature of 30-90° C. before or after assemblage of a battery.

13. The electrode according to claim 1, wherein the aliphatic nitrile compound is incorporated into the electrode active material.

14. The electrode of claim 1, wherein the aliphatic nitrile compound is an aliphatic dinitrile compound.

15. The electrode of claim 1, wherein the electrode active material comprises an oxide of the transition metal of the electrode active material.

16. The electrode according to claim 1, wherein the aliphatic nitrile compound is selected from the group consisting of succinonitrile, glutaronitrile, adiponitrile, pimelonitrile, octanedinitrile, azelonitrile, sebaconitrile, 1,9-dicyanononane and dodeanedinitrile.

17. The electrode according to claim 1, wherein the aliphatic nitrile compound is present in an amount of 1 to 10 weight percent, based on the total weight of the electrode active material.

18. The electrode according to claim 1, wherein the aliphatic nitrile compound is present in an amount of 2.5 weight percent or less, based on the total weight of the electrode active material.

19. The electrode according to claim 1, wherein the aliphatic nitrile compound is present in an amount of 1 to 20 weight percent, based on the total weight of the electrolyte.

20. The electrode according to claim 1, wherein the ligand-metal bond is Co—N bond.

21. An electrode comprising:
 a protective layer comprising an aliphatic nitrile compound-electrode active material complex,
 wherein the protective layer is on a surface of the electrode active material,
 wherein the protective layer comprises a ligand-metal bond between the electrode active material and the aliphatic nitrile compound, and
 wherein the aliphatic nitrile compound is present in an amount of 0.1-20 weight percent, based on the weight of electrolyte.

* * * * *

UNITED STATES PATENT AND TRADEMARK OFFICE
CERTIFICATE OF CORRECTION

| | | |
|---|---|---|
| PATENT NO. | : 8,445,143 B2 | Page 1 of 1 |
| APPLICATION NO. | : 11/056290 | |
| DATED | : May 21, 2013 | |
| INVENTOR(S) | : Young Soo Kim et al. | |

It is certified that error appears in the above-identified patent and that said Letters Patent is hereby corrected as shown below:

ON THE TITLE PAGE:

At item (30), correct the Foreign Application Priority Data to read as follows:

--Feb. 16, 2004     (KR) .................... 10-2004-0010070--.

Signed and Sealed this
Third Day of September, 2013

Teresa Stanek Rea
*Acting Director of the United States Patent and Trademark Office*